No. 647,597. Patented Apr. 17, 1900.
H. DESRUMAUX.
FILTERING APPARATUS.
(Application filed Nov. 23, 1899.)
(No Model.) 2 Sheets—Sheet 1.
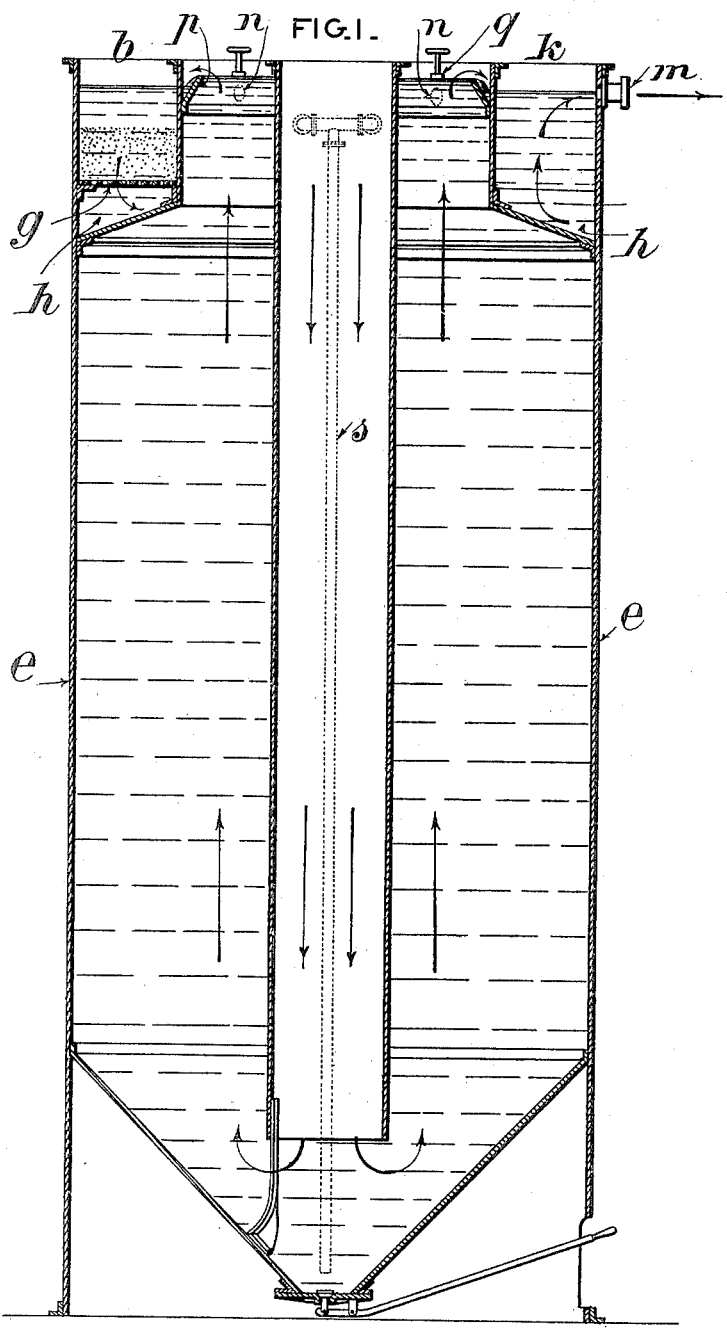

No. 647,597. Patented Apr. 17, 1900.
H. DESRUMAUX.
FILTERING APPARATUS.
(Application filed Nov. 23, 1899.)
(No Model.) 2 Sheets—Sheet 2.
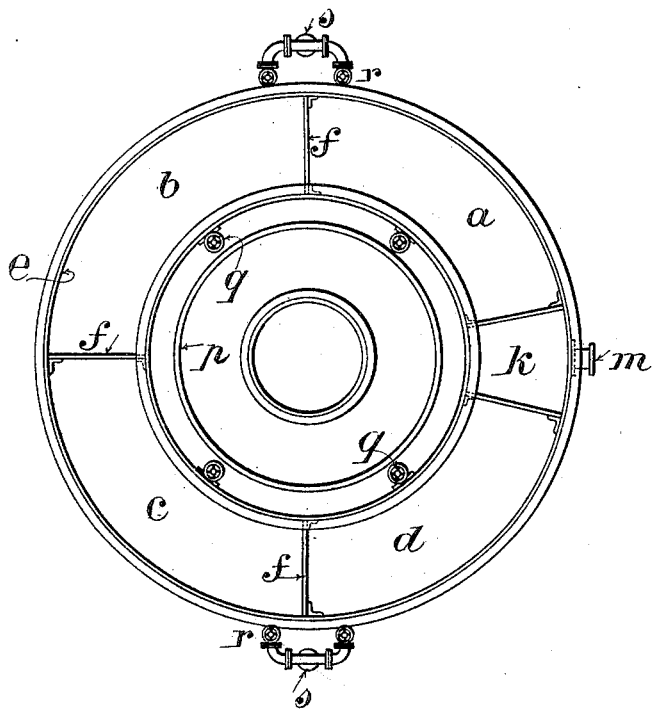
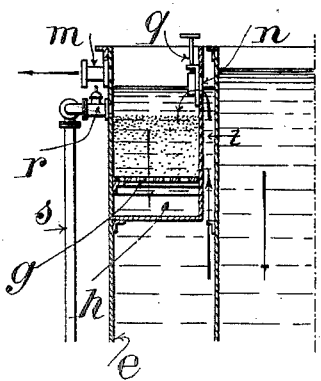
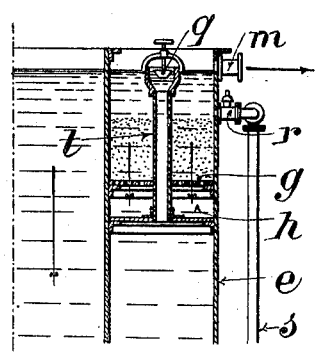
Witnesses:—
W. C. Pinckney
C. Holloway
Inventor:—
Henry Desrumaux,
By J. E. M. Bowen
Attorney.

UNITED STATES PATENT OFFICE.

HENRY DESRUMAUX, OF PARIS, FRANCE.

FILTERING APPARATUS.

SPECIFICATION forming part of Letters Patent No. 647,597, dated April 17, 1900.

Application filed November 23, 1899. Serial No. 738,099. (No model.)

*To all whom it may concern:*

Be it known that I, HENRY DESRUMAUX, a citizen of the Republic of France, residing at 17 Rue du Louvre, Paris, France, have invented certain new and useful Improvements in Filtering, Expurgating, and Decanting Apparatus, of which the following is a specification.

The system of filtering to which my invention relates has been chiefly studied in view of its application to expurgating and decanting apparatus and for the purpose of being able to use practically a powerful filter capable of giving perfectly-clear water even with waters difficult to elutriate, or imperfectly elutriated, in order to avoid or reduce the use of coagulating agents or to simplify the construction of decanting apparatus, and thus make them cheaper.

One of the essential characteristics of my invention resides in the application of a rational means for cleaning the filter, and which consists in causing to pass through the filtering matter a current of filtered water running in an inverse direction to the water to be filtered in order that the deposited substances shall be expelled at the same side at which they came into the mass of filtering matter. The several devices I have adopted to perform the cleaning operations according to this principle are based on the use of two or more filtering-compartments placed at the same level and each provided with a purging-cock situated at a higher level than the filtering matters, but at a lower level than the normal one of the water in the said compartments. Usually the water passes downward through the filtering matter; but when the purging-cock of a compartment is put to work there is established, in virtue of the principle of vessels containing liquid communicating with each other, a current of filtered water which passes upward through the said compartment and which comes from the other compartments. The impurities which may have previously become deposited in the filter and particularly in the upper part of the filtering matter are thus carried upward and out through the purging-cock. This mode of cleaning by means of a return-current of filtered water is absolutely efficient and can be put into practice in a very simple manner, as shown by the accompanying drawings, given as examples.

Figure 1 is a vertical section of an expurgating apparatus having four filtering-compartments. Fig. 2 is a plan of Fig. 1. Figs. 3 and 4 show modifications of the arrangement of the pipes which supply the water to be expurgated to the filters.

Similar letters refer to similar parts throughout the several views.

Referring to Figs. 1 and 2, $a\ b\ c\ d$ represent four compartments formed at the upper part of a reservoir or tank $e$, containing the water to be filtered. The said compartments are separated from each other by radial partitions $f$. Their bottom is formed by the perforated sheets of iron $g$ or by wirework or grating. The said compartments are half-full of a filtering substance, preferably in a granulated or pulverized state, such as gravel, sea or pit flint, or the like. Below the compartments $a\ b\ c\ d$ extends a collector $h$, which puts the compartments in communication with each other. Between two compartments—those $a$ and $d$, for example—there is provided an interval $k$, in which can rise the filtered water received by the collector $h$. The outlet-pipe $m$ for the filtered water opens into the said interval or space $k$. The arrival of the water into the filters takes place through the inlet-openings $n$, provided in their inner wall and which put them in communication with an annular channel $p$, forming an overfall for the great tank or reservoir $e$. The said openings $n$ can be closed when so desired by means of the gates $q$. Finally, each of the compartments $a\ b\ c\ d$ is provided with a purging-cock $r$, communicating with a let-off pipe $s$.

In the above-described arrangement it is essential, in the first place, that the cocks $r$ shall be placed at a higher level than the filtering matter and, in the second place, that the usual level of the water in the compartments $a\ b\ c\ d$, determined in this instance by the level of the outlet-pipe $m$, shall be higher than the level of the cocks $r$. That being so, the apparatus operates as follows:

When the gates $q$ are opened and the cocks $r$ closed, the water to be expurgated, which is constantly fed into the tank $e$, overflows into the overfall $p$ and passes into the filters $a\ b\ c\ d$. The water descends through the filtering matter in the direction shown by the arrows, and after getting rid of its impurities in the said matter it accumulates in the collector $h$, from which it is fed into the interval or space $k$, from which it runs off through the outlet-pipe $m$.

When it is required to clean one of the filters—the filter $b$, for example—the gate $q$, through which the water is fed into the same, is closed and the corresponding purging-cock $r$ is opened. As the water in the said filter $b$ is free to run off through the said cock, its level lowers immediately; but this lowering of the level determines at the same time a rupture of the hydrostatic equilibrium, the level of the water in the other filters $a\ c\ d$, which are in communication with the filter $b$, not having changed. There is therefore produced through the filtering matter in said filter $b$ an upward current of the filtered water coming from the collector $h$ and which takes the place of the water charged with impurities, the latter running off through the open purging-cock $r$. The upward current lasts as long as the said purging-cock $r$ remains open. It ceases when the latter is closed, after which the water rises to the same level in the cleaned compartment as in the others. The inlet-pipe for the water to be filtered in the cleaned compartment may then be opened again, and then the normal operation of the apparatus begins again.

The cleaning operation may be proceeded with successively for the four filters, as each of the same is provided with its inlet-gate $q$ and its purging-cock $r$. It would be the same with any other number of filters. The other arrangements shown in the drawings are based on the same principle.

In the modification shown in Fig. 3 the water to be fed to each compartment—the compartment $b$, for example—instead of taking an overfall concentric to the main tank or reservoir $e$ passes through a pipe $t$, rising up through the bottom of the collector $h$ and then within the compartment $b$, where its upper end is provided with a gate $q$. A similar arrangement is shown in Fig. 4, save that the pipe $t$ rises up in the center of the filtering-compartment instead of being carried up along the wall of the same. In both cases the water to be expurgated rises in the pipe $t$ and overflows into the said compartment through the top of the pipe.

The above examples are sufficient to show that my system of filter can be combined with any kind of expurgating and decanting apparatus, and the particular arrangements of the said system may be greatly varied without departing from the spirit and scope of my invention.

I claim—

1. In an expurgating and decanting apparatus, a filtering device comprising filtering-compartments situated at the same level, a common collector for the filtered water placed below the said compartments, pipe from the said collector and through which the water rises to be run off through another outlet-pipe, purging-cocks opening into each compartment above the filtering matters therein and below the said latter outlet-pipe, and means for establishing and stopping the feed of foul water to each of the said compartments, substantially as described, and for the purpose specified.

2. A filtering device comprising a reservoir of water to be filtered $e$, filtering-compartments situated in the same horizontal plane at the upper part of the said reservoir, a common collector of filtered water placed below the said compartments, a pipe starting from the said collector and through which the water rises into an outlet-pipe, purging-cocks opening into each compartment above the filtering matters and below the said outlet-pipe, an overfall $p$ for the water-reservoir $e$, and openings $n$, putting the filtering-compartments in communication with the said overfall, and each provided with a controlling-gate $q$, substantially as described and shown.

Signed at Paris, France, this 8th day of November, 1899.

HENRY DESRUMAUX.

Witnesses:
CAMILLE BLÉTRY,
EUGÈNE WATTIER.